United States Patent Office 3,355,468
Patented Nov. 28, 1967

3,355,468
PROCESS FOR PREPARING TRICYCLOHEXYL-
TIN CHLORIDE
Justin L. Hirshman, East Brunswick, and Joseph G.
Natoli, Parlin, N.J., assignors to M & T Chemicals Inc.,
New York, N.Y., a corporation of Delaware
No Drawing. Filed Apr. 8, 1964, Ser. No. 358,378
14 Claims. (Cl. 260—429.7)

ABSTRACT OF THE DISCLOSURE

In accordance with certain of its aspects, the novel process of this invention for preparing a tricyclohexyltin halide $(C_6H_{11})_3SnX$ by the reaction of a cyclohexylmagnesium halide $(C_6H_{11})MgX$ and a tin tetrahalide $SnX_4$ in molar ratio of 3:1 wherein X is an active halide selected from the group consisting of chloride and bromide, may comprise maintaining a reaction mixture containing $SnX_4$, adding to said reaction mixture $(C_6H_{11})MgX$ in amount of three moles per mole of $SnX_4$, and agitating said reaction mixture during said addition whereby said reaction mixture is maintained substantially uniform thereby forming $(C_6H_{11})_3SnX$.

---

This invention relates to a novel process for the preparation of organotin compounds. More particularly it relates to a process characterized by improved yields of selected products.

Prior attempts to produce $R_3SnX$ compounds have included those wherein an appropriate Grignard reagent has been reacted with tin tetrachloride according to the following reaction:

$$3RMgX + SnX_4 \rightarrow R_3SnX + 3MgX_2 \qquad (1)$$

This reaction may be carried out in accordance with the usual Grignard technique by forming the Grignard reagent in the reaction vessel and adding thereto the tin tetrahalide, usually tin tetrachloride. It has been found however that this reaction has been uniformly unsuccessful in permitting attainment of high yields of $R_3SnX$ product. For example, the attempted production of tributyltin chloride by this process commonly gives yields of little or none of this compound together with 55%–70% or more of undesirable by-products including tetrabutyltin. The attempted production of triphenyltin chloride may give a yield of little or none of this compound, but rather a high yield of tetraphenyltin, as by simultaneously occurring side reaction. In the case of the attempted preparation of tricyclohexyltin chloride, the yield of desired product may be typically as low as 10%–20% while the yield of undesirable by-products including tetracyclohexyltin may be 50% or more because of simultaneously occurring side reactions including the following:

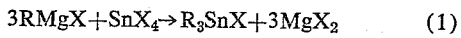
$$4(C_6H_{11})MgCl + SnCl_4 \rightarrow (C_6H_{11})_4Sn + 4MgCl_2 \qquad (2)$$

Accordingly it has been found to be desirable to prepare products such as triphenyltin chloride, tributyltin chloride, and tricyclohexyltin chloride by the disproportionation of the tetra- product:

$$3R_4Sn + SnCl_4 \rightarrow 4R_3SnCl \qquad (3)$$

This disproportionation reaction may be acompanied by side reactions including those which produce, in the case where R is cyclohexyl, considerable amounts of other by-products including, e.g., di(cyclohexyl)tin dichloride. Accordingly the yield of the desired tricyclohexyl product has been uneconomically low, typically as low as about 10%. In this application, the symbol $C_6H_{11}$ will be employed to indicate the cyclohexyl radical or group.

It is an object of this invention to provide a process for production of organotin compounds in high yields. Other objects will be apparent to those skilled in the art on inspection of the following description.

In accordance with certain of its aspects, the novel process of this invention for preparing a tricyclohexyltin halide $(C_6H_{11})_3SnX$ by the reaction of a cyclohexylmagnesium halide $(C_6H_{11})MgX$ and a tin tetrahalide $SnX_4$ in molar ratio of 3:1 wherein X is an active halide selected from the group consisting of chloride and bromide, may comprise maintaining a reaction mixture containing $SnX_4$, adding to said reaction mixture $(C_6H_{11})MgX$ in amount of three moles per mole of $SnX_4$, and agitating said reaction mixture during said addition whereby said reaction mixture is maintained substantially uniform thereby forming $(C_6H_{11})_3SnX$.

In accordance with a preferred aspect of this invention, the novel process for preparing a tricyclohexyltin halide $(C_6H_{11})_3SnX$ by the reaction of a cyclohexylmagnesium halide $(C_6H_{11})MgX$ and tin tetrahalide $SnX_4$ in molar ratio of 3:1 wherein X is an active halide selected from the group consisting of chloride and bromide may comprise maintaining a reaction mixture containing $SnX_4$ in excess of $(C_6H_{11})MgX$, simultaneously adding to said reaction mixture $(C_6H_{11})MgX$ and the remainder of said $SnX_4$ in molar ratio of 3:1, agitating said reaction mixture during said addition whereby said reaction mixture is maintained substantially uniform, and adding to said reaction mixture the remainder of said $(C_6H_{11})MgX$ thereby forming said $(C_6H_{11})_3SnX$.

The cyclohexyltin product $(C_6H_{11})_3SnX$ which may be formed in high yield by practice of this invention, may include products wherein the cyclohexyl group, herein designation $C_6H_{11}$—, may be inertly substituted.

Typical products which may be formed by the process of this invention, in addition to tricyclohexyltin bromide and tricyclohexyltin chloride, may include:

tri(2-methylcyclohexyl) tin chloride
tri(2-butylcyclohexyl) tin chloride
tri(2-phenylcyclohexyl) tin chloride
tri(3,3,5-trimethylcyclohexyl) tin chloride
tri(3,5-dimethylcyclohexyl) tin chloride
tri(4-t-butylcyclohexyl) tin chloride
tri(2-isopropyl-5-methylcyclohexyl) tin chloride
tri(2,5-dimethylcyclohexyl) tin chloride
tri(3,4-dimethylcyclohexyl) tin chloride together with the corresponding bromide derivatives, etc.

The tin tetrahalide which may be used in practice of this invention may be $SnX_4$ wherein X may be an active halide selected from the group consisting of chloride and bromide. Preferably, $SnX_4$ may be tin tetrachloride, $SnCl_4$.

The Grignard reagent which may be used in practice of this invention, preferably cyclohexyl magnesium chloride (and including Grignard reagents containing inertly substituted cyclohexyl radicals as noted supra), may be prepared by the reaction of a cyclohexyl halide with magnesium according to the following reaction:

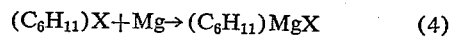
$$(C_6H_{11})X + Mg \rightarrow (C_6H_{11})MgX \qquad (4)$$

This reaction may preferably be carried out under an inert atmosphere, e.g., nitrogen gas, in the presence of an aliphatic ether such as diethyl ether, di-n-butyl ether, etc., or in the presence of a compound Q as hereinafter described. Various initiators may be present to facilitate formation of the Grignard reagent.

The compound Q, as this expression is used herein for the purpose of brevity, includes cyclic ethers containing 5–6 members in the ring with at least one hydrogen atom attached to each carbon atom in the ring and having the formula:

wherein X is a methylene group or an N-alkyl group; R″ is an unsubstituted saturated divalent aliphatic hydrocarbon radical; R′ is an ethylene radical, an ethylenically unsaturated divalent hydrocarbon radical, a methylene radical, or =CHR‴ (R‴ being hydrogen or an aliphatic radical); and O is oxygen. When X is N-alkyl, the ring shall contain 6 members with X and O in a position 1:4 with respect to each other.

Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. The compound Q may bear as substituent inert groups, i.e., groups which are not reactive with organomagnesium halides, or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e., the free π-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled in the art from the present specification. Since compound Q may also function as a solvent, a compound Q which has a high melting point may be used in practice of this invention, but if it is used as solvent, the high melting point (e.g., above 90° C.) may cause difficulty in carrying out the reaction.

The Grignard reagent formed by the process of, e.g., reaction (4) supra may be preferably in the form of a solution of its complex with the ether or the compound Q, e.g., as a solution of $(C_6H_{11})MgX \cdot Q$ in Q. For purpose of convenience, the equations herein are written without reference to the ether or compound Q which may be present.

In practice of the process of this invention, the reaction between the tin tetrahalide $SnX_4$ and the Grignard reagent $(C_6H_{11})MgX$ may be:

$$3(C_6H_{11})MgX + SnX_4 \rightarrow (C_6H_{11})_3SnX + 3MgX_2 \quad (5)$$

This reaction may be carried out by adding to a reaction vessel 1–100 mole percent, preferably 10–40 mole percent, say 25 mole percent of the $SnX_4$ to be used in the reaction. Preferably, this may also be added with appropriate solvent, typically a hydrocarbon having a boiling point of 30° C.–150° C., say about 137° C., including, e.g., toluene, heptane, cyclohexane, etc. The preferred hydrocarbon may be xylene which may be added to the $SnX_4$ in amount of 10–20 moles, say 15 moles, per mole of $SnX_4$ to be consumed during the reaction. In the preferred embodiment of the invention, the tin tetrahalide $SnX_4$ and the solvent may be added to the reaction vessel in the form of a solution of tin tetrahalide in the solvent.

To the preferably well-agitated reaction mixture containing $SnX_4$ in excess of $(C_6H_{11})MgX$, and preferably containing none of the latter, there may be simultaneously added the remainder of the $SnX_4$, i.e., 0–99 mole percent, preferably 60–90 mole percent, say 75 mole percent of the $SnX_4$ used in the reaction, together with all of the Grignard reagent $(C_6H_{11})MgX$.

In the preferred embodiment, the rates of addition of the added $(C_6H_{11})MgX$ and the $SnX_4$ during addition may be preferably maintained at 3 moles of $(C_6H_{11})MgX$ per mole of $SnX_4$. Control of the ratio during addition at the stated equivalent level of preferably 3:1 may be effected by controlling the flow of each of the reactants. The unusual results attained by the process of this invention may particularly result at least in part from the technique of controlling the ratio of rates of addition of the added materials so that it falls within this ratio of about 3±0.3:1. Thus the reaction medium at a given time may be considered as having been formed by mixing the reactants in equivalent, i.e., 3:1 molar proportion, preferably in the presence of an excess of $SnX_4$ corresponding to that which was present, if any, in the reaction vessel at the beginning of the reaction. The high degree of agitation preferably maintained in the reaction mixture insures that the reaction mixture is maintained uniform, i.e., that at no place in the reaction mixture is there any localized substantial excess of $(C_6H_{11})MgX$.

Preferably, the exothermic reaction mixture may be maintained at 25° C.–95° C., preferably less than 80° C., say at 72° C. Reaction may, if desired, be carried out at 30° C.–40° C. Typically, the $(C_6H_{11})MgX$ and $SnX_4$ may be added to the reaction mixture over 60–210 minutes, say 120 minutes.

The remainder of the $(C_6H_{11})MgX$, typically 5–100 mole percent, say 25 mole percent, may then be added to the reaction mixture over 15–60 minutes, say 30 minutes. Preferably the reaction mixture may during this addition be maintained at gentle reflux temperature, typically 75° C.–85° C. when the refluxing liquid includes, e.g., xylene-tetrahydrofuran, for 30–240 minutes, say 120 minutes.

The reaction mixture may then be hydrolyzed to liberate the product $(C_6H_{11})_3SnX$. Typically this may be effected by diluting the mixture at 30° C.–40° C., say 30° C. with water, preferably containing electrolyte such as sulfuric acid in the amount of 1%–15%, say 10% by weight. Typically hydrolysis may be effected in two steps by mixing the reaction mixture in a first step with 300–400, say 325 parts by weight of water per mole of $SnX_4$ utilized which amount of water may be sufficient to form the hexahydrate $MgX_2 \cdot 6H_2O$ and an organic layer. The organic layer may be separated and in a second step the hexahydrate dissolved in 150–500, say 300 parts of water, to which may be thereafter added electrolyte, say 150–300, say 250 parts of 10% sulfuric acid. The mixture may be agitated and the organic layer drawn off and combined with the earlier-obtained organic layer.

In accordance with an alternative embodiment, the reaction mass, at 30° C.–40° C., may be completely hydrolyzed by mixing with 400–740, say 500, parts by weight of water, preferably followed by the addition of electrolyte, such as 10% sulfuric acid, in an amount of 300–600, say 500 parts. The organic layer which separates may be decanted.

In accordance with certain aspects of this invention, the organic layer may be stripped of solvent by distillation. Preferably distillation may be effected at atmospheric pressure for 120–240 minutes, say 180 minutes to pot temperature of 135° C.–155° C., typically 145° C. The reaction mixture may be further distilled at pressure of 10–55 mm. Hg typically 25–35 mm. Hg to a final pot temperature of about 130° C.–155° C., say 145° C.

The residue at temperature of at least about 130° C., and preferably 130° C.–140° C., may be mixed with solvent, preferably isopropanol, in amount of 400–2000, say 1200 parts. Preferably the mixture may be heated to reflux for 10–60 minutes, say 30 minutes and filtered to remove tetracyclohexyltin by-product. The solvent may be cooled to 0° C.–25° C., say 15° C., to precipitate product which may be filtered and washed with 50–250, say 100 parts, of cooled solvent. The product may then be oven-dried by 35° C.–100° C., say 50° C., for 60–600 minutes, say 240 minutes, until it is free of solvent. Typical yield of product may be 70%–90%. When tricyclohexyltin chloride is prepared in accordance with the preferred embodiment of this invention, this product may be recovered in yield of typically 70%–90% having a melting point of 128° C.–129° C.

The solvent-filtrate may be distilled to recover solvent as distillate and a residue of by-products which may be further worked-up to yield additional product.

Practice of this invention may be observed by reference to the following illustrative examples wherein all parts noted are parts by weight unless otherwise specified.

*Example 1*

In this example which represents practice of the invention, cyclohexylmagnesium chloride Grignard reagent may be prepared by charging 125.7 parts of magnesium turnings to a reaction vessel which may be purged with nitrogen gas. 155 parts of tetrahydrofuran may be added together with an initiation mixture containing 9.1 parts of cyclohexyl bromide and 8 parts of cyclohexyl chloride. To the reaction mixture, there may be added slowly a mixture containing 599 parts of cyclohexyl chloride and 1134 parts of tetrahydrofuran with agitation. During addition, external heating may be applied and maintained until the temperature is raised to about 75° C. Thereafter reaction may proceed exothermically with pot temperature reaching as high as 78° C. over the course of 60 minutes. External heating may be withdrawn and reaction may further continue for about 60 minutes. The reaction mixture may then be cooled to room temperature.

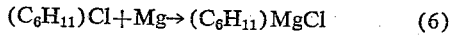
$$(C_6H_{11})Cl + Mg \rightarrow (C_6H_{11})MgCl \qquad (6)$$

A charge solution containing 390 parts of tin tetrachloride and 282 parts of xylene may be prepared; and 25% of this mixture, 168 parts, may be charged into a reaction vessel together with 645 parts of xylene.

The cyclohexylmagnesium chloride Grignard reagent and the remaining 75% of the tin tetrachloride-in-xylene mixture may then be added to the reaction vessel over approximately two hours. During this time, the rate of addition of the Grignard and the tin tetrachloride is controlled so that the molar ratio of Grignard to $SnX_4$, as added, is approximately 3:1. The temperature may rise to 80° C. during addition.

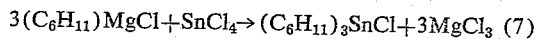
$$3(C_6H_{11})MgCl + SnCl_4 \rightarrow (C_6H_{11})_3SnCl + 3MgCl_3 \qquad (7)$$

At the end of this time, the remaining Grignard reagent, 510 parts may be added over approximately 30 minutes. The reaction mixture may then be maintained at 75° C.–85° C., gentle reflux, for two hours.

The reaction mixture may be cooled to 30° C.–35° C. and then mixed with 630 parts of water. The pale yellow oil which may be formed may be decanted to leave the solid magnesium chloride hexahydrate. The latter may be dissolved in 500 parts of water and acidified with 500 parts of 10% sulfuric acid. On stirring an additional organic layer may separate. This may be decanted and combined with the organic layer earlier obtained.

The combined organic layer may be stripped of solvent by atmospheric pressure distillation over 180 minutes to pot temperature of 145° C., followed by vacuum distillation of 25–35 mm. Hg for 60 minutes to a final pot temperature of about 145° C.

The residue from this distillation may be poured into 1794 parts of isopropanol solvent. The mixture may be heated to reflux over 30 minutes, filtered, and cooled to 15° C. at which point product tricyclohexyltin chloride may precipitate. The precipitate may be filtered, washed with 100 parts of isopropanol, and oven dried. 462 parts (76% yield) of tricyclohexyltin chloride may be obtained having a melting point of 128°–129° C.

Examples 2, 3 and 4 are a comparative series of examples wherein Example 2 sets forth a process in accordance with the invention for producing tricyclohexyltin chloride; Example 3 is an identical control process except that the desired product is tributyltin chloride; and Example 4 is an identical control process except that the desired product is triphenyltin chloride.

*Example 2*

In this example which represents practice of the invention, 215 parts of xylene and 73.5 parts of $SnCl_4$-xylene mix (prepared from 130 parts of $SnCl_4$ and 164 parts of xylene) may be charged into a reaction vessel fitted with two addition funnels. One addition funnel may be charged with 685 parts of cyclohexylmagnesium chloride in tetrahydrofuran (the same Grignard composition as used for Example 1). The other addition funnel may be charged with 220.5 parts, the balance of the tin-tetrachloride-xylene mix.

The cyclohexyl Grignard and the tin tetrachloride-xylene mix may be fed into the reaction vessel simultaneously, adjusting the feed rates so that for every 23 parts of Grignard charged, 10 parts of tin tetrachloride-xylene mix are fed into the reaction vessel, this being equivalent to a molar ratio of 3 parts Grignard to 1 part of tin tetrachloride. 685 parts of the cyclohexyl Grignard and the 220.5 parts of the tin tetrachloride-xylene may be added over 90 minutes. During the addition, the temperature is maintained by cooling if necessary at 30° C.–40° C. The balance (25% or 171 parts) of the cyclohexyl Grignard solution may then be added over 30 minutes. At the completion of this addition, the reaction mass may be maintained at 30° C.–40° C. for a two-hour period.

The reaction mass at 30° C.–40° C. may be hydrolyzed to the hexahydrate stage by the addition of 162 parts of water. The magnesium chloride hexahydrate in the flask may be acidified with 200 parts of 5% sulfuric acid, stirred 30 minutes, and allowed to settle. The organic layer may be separated and the solids contained therein filtered off. The organic layer on analysis may be found to contain the following expressed in terms of weight percent yield:

| | Percent |
|---|---|
| Tetracyclohexyltin | 7.98 |
| Tricyclohexyltin chloride | 86.7 |
| Dicyclohexyltin dichloride | 6.17 |

On separation by the procedure set forth in Example 1, 174 parts (86.7% yield) of tricyclohexyltin chloride having a melting point of 125° C.–128° C. may be obtained.

*Example 3*

In this control example, 215 parts of xylene and 73.5 parts of $SnCl_4$-xylene mix (prepared from 130 parts of $SnCl_4$ and 164 parts of xylene) may be charged into a reaction vessel. One addition funnel may be charged with 642 parts of a solution of 175.5 parts of butyl magnesium chloride in 466.5 parts of tetrahydrofuran (prepared in the same manner as the Grignard composition used for Example 1 except that it was prepared from butyl chloride rather than from cyclohexyl chloride). The other addition funnel may be charged with the balance, 220.5 parts, of the tin tetrachloride-xylene mix.

The butyl Grignard and the tin tetrachloride mix may be fed into the reaction vessel, simultaneously adjusting the feed rates so that for every 23 parts of Grignard charged, 10 parts of tin tetrachloride-xylene mix are fed into the reaction vessel, this being equivalent to a molar ratio of 3 parts Grignard to 1 part of tin tetrachloride. 482 parts of the butyl Grignard and the 220.5 parts of the tin tetrachloride-xylene mix may be added over 60–90 minutes. During the addition, the temperature is maintained by cooling if necessary at 30° C.–40° C. The balance 25% or 160 parts of the butyl Grignard solution may then be added over 20–30 minutes. At the completion of this addition, the reaction mass may be maintained at 300° C.–40° C. for a two-hour period.

The reaction mass at 30° C.–40° C. may be hydrolyzed to the hexahydrate stage by the addition of 162 parts of water. The magnesium chloride hexahydrate in the flask may be acidified with 200 parts of 5% sulfuric acid, stirred 30 minutes, and allowed to separate. The organic layer may be separated and the solids contained therein filtered off. The organic layer on work-up and analysis may be found to contain the following expressed in terms of weight percent yield:

| | Percent |
|---|---|
| Tetrabutyltin | 67.6 |
| Tributyltin chloride | 0 |
| Dibutyltin dichloride | 6.7 |
| Monobutyltin trichloride | 19.5 |

*Example 4*

In this control example, 215 parts of xylene and 73.5 parts of $SnCl_4$-xylene mix (prepared from 130 parts of $SnCl_4$ and 164 parts of xylene) may be charged into a reaction vessel fitted with two addition funnels. One addition funnel may be charged with 564 parts of a solution containing 136.8 parts of phenylmagnesium chloride in 427 parts of tetrahydrofuran (prepared in the same manner as the Grignard composition used for Example 1 except that it was prepared from chlorobenzene rather than from cyclohexyl chloride). The other addition funnel may be charged with 221 parts, the balance of the tin tetrachloride-xylene mix.

The phenyl Grignard and the tin tetrachloride-xylene mix may be fed into the reaction vessel simultaneously, adjusting the feed rates so that for every 23 parts of Grignard charged, 10 parts of tin tetrachloride-xylene mix are fed into the reaction vessel, this being equivalent to a molar ratio of 3 parts of Grignard to 1 part of tin tetrachloride. 423 parts of the phenyl Grignard solution and the 221 parts of the tin tetrachloride-xylene may be added over 90 minutes. During the addition, the temperature may be maintained by cooling if necessary at 30° C.–40° C. The balance (25% or 141 parts) of the Grignard may then be added over 30 minutes. At the completion of this addition, the reaction mass may be maintained at 30° C.–40° C. for a two-hour period.

The reaction mass at 30° C.–40° C. may then be hydrolyzed to the hexahydrate stage by the addition of 162 parts of water. The magnesium chloride hexahydrate in the flask may be acidified with 200 parts of 5% sulfuric acid, stirred 30 minutes, and allowed to settle. The organic layer may be separated and the solids contained therein filtered off. The white crystalline solids may be dried at 50° C. for 12 hours to give 147.6 parts of white crystalline crude tetraphenyltin. This corresponds to a 69.2% yield of tetraphenyltin based on tin tetrachloride. The organic filtrate on analysis may be found to contain the following expressed in terms of weight percent yield (the tetraphenyltin being obtained by filtration supra):

| | Percent |
|---|---|
| Tetraphenyltin | 64.1 |
| Triphenyltin chloride | 19.7 |
| Diphenyltin dichloride | 17.6 |
| Monophenyltin trichloride | 0 |

From inspection of comparative Examples 2, 3, and 4, it will be apparent that the novel process of this invention for the production of tricyclohexyltin halides may permit attainment of an 86.7% yield; in contrast, as noted in Example 3, no tributyltin chloride may be attained and Example 4 wherein 19.7% of triphenyltin chloride may be attained.

*Example 5*

In this illustrative example, which represents practice of this invention, 390 parts of tin tetrachloride and 600 parts of xylene may be charged into a reaction vessel equipped with thermometer, agitator, addition funnel, and condenser. 643 parts of cyclohexylmagnesium chloride Grignard in 1387 parts tetrahydrofuran (prepared as in Example 1 supra) may be added to the tin tetrachloride. After the addition of approximately 25% of the Grignard, the reaction mass may thicken and 645 parts of xylene may be added. The balance of the Grignard may then be added allowing the temperature to rise to reflux. At completion of the addition, the reaction mixture may be maintained at reflux for 3 hours. The reaction mixture may then be cooled to 30° C. and hydrolyzed to the hexahydrate by addition of 486 parts of water. The upper oily layer may be decanted. The magnesium chloride hexahydrate may then be dissolved with 500 parts of water and acidified with 500 parts of 5% sulfuric acid. The oil which separated may be combined with the oil previously obtained. The combined oil may be stripped of solvent to a final pot temperature of 135° C. at 50 mm. Hg pressure. The pot bottoms may then be dissolved in 1560 parts of isopropanol and heated to reflux. The isopropanol solution may be filtered and the filtrate cooled to 20° C. The white crystalline solid may be recovered by filtration, the filter cake being washed with 78.5 parts of isopropanol and then oven-dried at 50° C. overnight. 382 parts (63% yield) of tricyclohexyltin chloride (melting point of 125° C.–126° C.) was obtained.

Although this invention has been disclosed by reference to various specific examples, it will be apparent to those skilled in the art that various modifications and changes may be made thereto which fall within the scope of this invention.

We claim:
1. The process for preparing $(C_6H_{11})_3SnX$ by the reaction of $(C_6H_{11})MgX$ and $SnX_4$ in molar ratio of 3:1 wherein X is selected from the group consisting of chloride and bromide which comprises maintaining a reaction mixture containing $SnX_4$, adding to said reaction mixture $(C_6H_{11})MgX$ in amount of 3 moles per mole of $SnX_4$, and agitating said reaction mixture during said addition whereby said reaction mixture is maintained substantially uniform thereby forming $(C_5H_{11})_3SnX$.

2. The process of claim 1 wherein said reaction mixture is maintained at a temperature of 25° C.–95° C. during said addition.

3. The process of claim 1 wherein said reaction is carried out in the presence of aliphatic ether.

4. The process of claim 1 wherein said reaction mixture comprises $SnX_4$ and a hydrocarbon solvent having a boiling point of 30° C.–150° C., and said $(C_6H_{11})MgX$ is added as a solution of its ether complex in aliphatic ether.

5. The process for preparing $(C_6H_{11})_3SnX$ by the reaction of $(C_6H_{11})MgX$ and $SnX_4$ in molar ratio of 3:1 wherein X is selected from the group consisting of chloride and bromide which comprises maintaining a reaction mixture containing $SnX_4$ in excess of $(C_6H_{11})MgX$, simultaneously adding to said reaction mixture $(C_6H_{11})MgX$ and the remainder of said $SnX_4$ in molar ratio of 3:1, agitating said reaction mixture during said addition whereby said reaction mixture is maintained substantially uniform, and adding to said reaction mixture the remainder of said $(C_6H_{11})MgX$ thereby forming said $(C_6H_{11})_3SnX$.

6. The process of claim 5 wherein said reaction mixture is maintained at a temperature of 25° C.–95° C. during said addition.

7. The process of claim 5 wherein said reaction is carried out in the presence of aliphatic ether.

8. The process of claim 5 wherein said $SnX_4$ is in the form of a solution of $SnX_4$ in a hydrocarbon solvent having a boiling point of 30° C.–150° C., and said $(C_6H_{11})MgX$ is in the form of a solution of its ether complex in aliphatic ether.

9. The process for preparing $(C_6H_{11})_3SnX$ by the reaction of $(C_6H_{11})MgX$ and $SnX_4$ in molar ratio of 3:1 wherein X is selected from the group consisting of chloride and bromide, which comprises maintaining a reaction mixture containing 10–40 mole percent of the $SnX_4$ to be used, simultaneously adding to said reaction mixture $(C_6H_{11})MgX$ and the remainder of said $SnX_4$ in molar ratio of 3:1, agitating said reaction mixture during said addition whereby said reaction mixture is maintained substantially uniform, adding to said reaction mixture the remainder of said $(C_6H_{11})MgX$, and maintaining said reaction mixture at a temperature of 25° C.–95° C. during said addition thereby forming $(C_6H_{11})_3SnX$.

10. The process of claim 9 wherein said reaction is carried out in the presence of aliphatic ether.

11. The process of claim 9 wherein said reaction mixture comprises $SnX_4$ and a hydrocarbon solvent having a boiling point of 30° C.–150° C. and said $(C_6H_{11})MgX$ is added as a solution of its ether complex in a cyclic ether containing 5–6 members in the ring and having the formula

wherein X is selected from the group consisting of methylene and N-alkyl, R″ is an unsubstituted saturated divalent aliphatic hydrocarbon radical; R′ is selected from the group consisting of the ethylene radical, ethylenically unsaturated divalent hydrocarbon radical, methylene radical and $=CHR'''$ wherein R‴ is selected from the group consisting of hydrogen and aliphtic radicals; and when X is N-alkyl, the ring contains 6 members and O and X are in a position 1:4 with respect to each other.

12. The process for preparing $(C_6H_{11})_3SnX$ by the reaction of $(C_6H_{11})MgX$ and $SnX_4$ in molar ratio of 3:1 wherein X is selected from the group consisting of chloride and bromide, which comprises maintaining a reaction mixture containing a hydrocarbon solvent having a boiling point of 30° C.–150° C. and 10–40 mole percent of the $SnX_4$ to be used, simultaneously adding to said reaction mixture over a period of 60–210 minutes $(C_6H_{11})MgX$ in the form of a solution of its ether complex in aliphatic ether and the remainder of said $SnX_4$ as a solution in a hydrocarbon solvent having a boiling point of 30° C.–150° C. in the molar ratio of 3:1; agitating said reaction mixture during said addition whereby said reaction mixture is maintained substantially uniform, adding to said reaction mixture the remainder of said $(C_6H_{11})MgX$ over a period of 15–60 minutes, maintaining said reaction at a temperature of 25° C.–95° C. during said addition thereby forming $(C_6H_{11})_3SnX$.

13. The process of claim 12 wherein said hydrocarbon solvent is xylene.

14. The process of claim 12 wherein said aliphatic ether is tetrahydrofuran.

References Cited
UNITED STATES PATENTS 3,010,979   11/1961   Ramsden _____ 260—429.7
3,067,226   12/1962   Ramsden _____ 260—429.7

TOBIAS E. LEVOW, *Primary Examiner.*

W. F. W. BELLAMY, *Assistant Examiner.*